United States Patent [19]

Kabe et al.

[11] Patent Number: 5,211,780
[45] Date of Patent: May 18, 1993

[54] PNEUMATIC RADIAL TIRE FOR HEAVY-DUTY VEHICLES

[75] Inventors: Kazuyuki Kabe; Nobuhiro Yamashita, both of Hiratsuka; Izumi Kuramochi; Kohtaroh Iwabuchi, both of Tokyo, all of Japan

[73] Assignee: The Yokohama Rubber Co., Ltd., Tokyo, Japan

[21] Appl. No.: 717,783

[22] Filed: Jun. 17, 1991

[30] Foreign Application Priority Data

Jun. 19, 1990 [JP] Japan .................................. 2-158549

[51] Int. Cl.⁵ .............................................. B60C 11/01
[52] U.S. Cl. ............................. 152/209 B; 152/209 R; 152/523
[58] Field of Search .......... 152/209 R, 209 B, 209 A, 152/209 D, 523; D12/141-145, 152

[56] References Cited

U.S. PATENT DOCUMENTS

| D. 141,821 | 7/1945 | Walker | D12/141 |
| D. 169,914 | 6/1953 | Roberts | 152/209 D |
| D. 211,923 | 8/1968 | Bartlett | D12/141 |
| 2,236,903 | 4/1941 | Hale | 152/209 R |
| 2,459,750 | 1/1949 | Dybvig | 152/209 R |
| 2,808,867 | 10/1957 | Buddenhagen et al. | 152/209 R |
| 4,905,747 | 3/1990 | Ogawa | 152/209 R |

FOREIGN PATENT DOCUMENTS

| 1024825 | 2/1958 | Fed. Rep. of Germany | 152/209 R |
| 0754438 | 8/1956 | United Kingdom | 152/209 R |

*Primary Examiner*—Michael W. Ball
*Assistant Examiner*—Nancy T. Krawczyk
*Attorney, Agent, or Firm*—Nikaido, Marmelstein, Murray & Oram

[57] ABSTRACT

A pneumatic radial tire for heavy-duty vehicles in which reinforcement belts comprising metal cords are disposed in the tread portion, and a plurality of main grooves extending in the circumferential direction of the tire are provided in the tread surface. In addition, recessed and projecting portions are provided on the edges of the tread surface in a zig-zag fashion along the circumferential direction of the tire.

4 Claims, 2 Drawing Sheets

PNEUMATIC RADIAL TIRE FOR HEAVY-DUTY VEHICLES

BACKGROUND OF THE INVENTION

The present invention relates to a pneumatic radial tire suitable for use on heavy-duty motor vehicles such as trucks, buses or the like.

Recently, pneumatic radial tires have been used on heavy-duty vehicles such as trucks, buses or the like as well, and their superior properties such as high-speed performance, abrasion resistance and low fuel consumption have been exhibited. In this type of pneumatic radial tire for heavy-duty vehicles, a reinforcement layer in the tread portion is comprised of metal cords and has remarkably high rigidity so as to withstand the heavy load.

However, when this type of heavy-duty pneumatic radial tire having a tread portion with high rigidity is used, a high internal pressure is applied inside, and once the tire is caught in ruts in a road, the tire is subject to an excessive external force by the road when it is forced out of the ruts. This poses a problem in that a wandering phenomenon in which the steering wheel becomes uncontrollable is produced.

In order to solve this problem, the availability of a heavy-duty pneumatic radial tire with which a rut-related wandering phenomenon hardly occurs while maintaining the superior properties inherent in pneumatic radial tires such as high speed performance, abrasion resistance, and low fuel consumption has long been anticipated.

SUMMARY OF THE INVENTION

An object of the present invention is to provide a heavy-duty pneumatic radial tire which hardly generates a rut-related wandering phenomenon while maintaining the superior properties inherent in pneumatic radial tires such as high-speed performance, abrasion resistance, and low fuel consumption.

In order to accomplish the above object, the present invention provides a pneumatic radial tire for heavy-duty vehicles having reinforcement belts comprising metal cords disposed in the tread portion and a plurality of main grooves formed in the tread surface so as to extend in the circumferential direction of the tire, which is characterized in that recessed and projecting portions are provided on the edges of the tread surface in a zig-zag fashion along the circumferential direction of the tire.

Providing recessed and projecting portions on the edges of the tread surface in a zig-zag fashion along the circumferential direction of the tire as described above makes it possible to prevent the occurrence of rut-related wandering phenomenon without sacrificing the superior properties inherent in pneumatic radial tires for heavy-duty vehicles such as high-speed performance, abrasion resistance, and low fuel consumption, whereby the steering wheel is kept controllable even on a road having ruts formed therein, and safe driving is thus attained under such road conditions.

Description of the Preferred Embodiment

Figure 1:
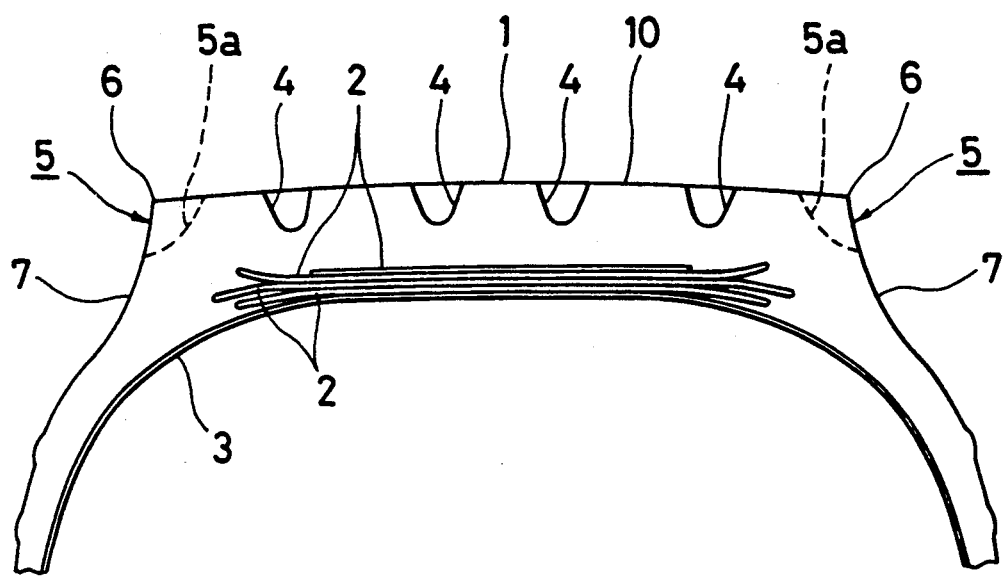
FIG. 1 is a sectional view showing an essential part of a pneumatic radial tire for heavy-duty vehicles according to the present invention.

In FIG. 1, reference numeral 1 denotes a tread portion, reference numeral 2 a reinforcement belt circumferentially disposed in the tread portion, and reference numeral 3 denotes a carcass. There are at least one or more layers of carcasses, and each layer comprises metal cords or organic fiber cords that are disposed substantially at 90° with reference to the circumferential direction of the tire. There are at least two or more layers of reinforcement belts 2 (four layers in this embodiment), each mainly comprising metal cords. In these reinforcement belts 2, the metal cords are inclined at 15° to 30° with reference to the circumferential direction of the tire, and adjacent layers are disposed in a relationship in which the cords in each layer intersect with cords in adjacent layers.

Figure 2:
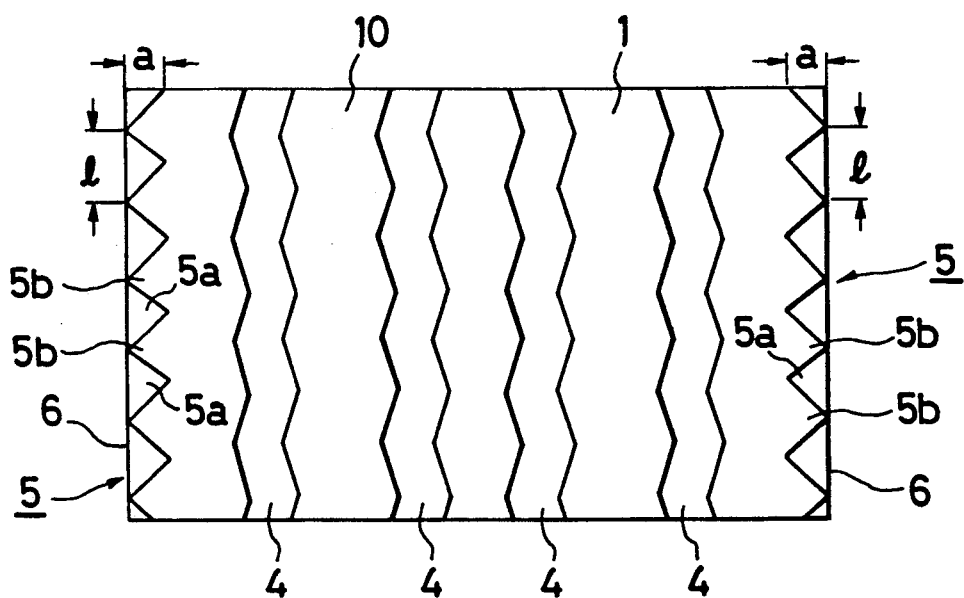
FIG. 2 is a plan view of a tread portion of the pneumatic radial tire for heavy-duty vehicles according to the present invention.
Figure 3:
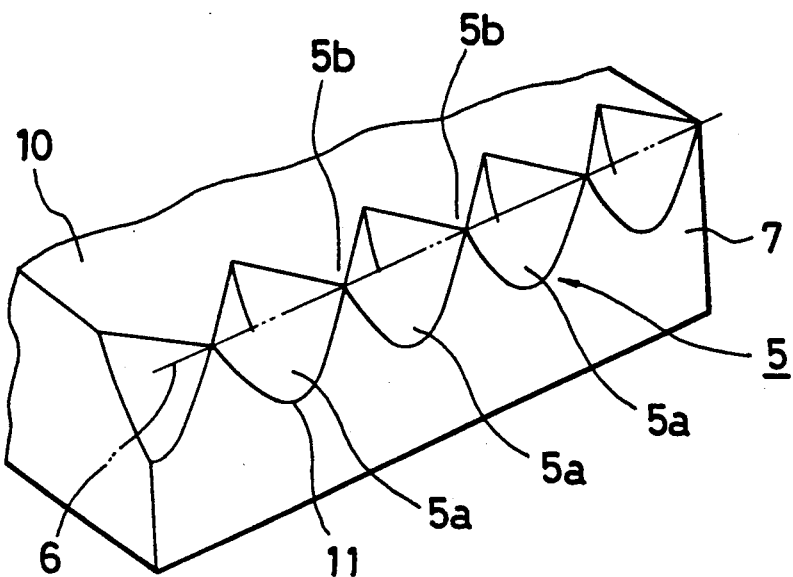
FIG. 3 is a perspective view showing an essential part of a pneumatic radial tire for heavy-duty vehicles according to the present invention.

As shown i FIG. 2, a plurality of main grooves 4 extending in the circumferential direction of the tire are formed in the ground contacting surface of the tread portion 1, i.e., in a tread surface 10, forming a basic rib pattern. Recessed and projecting portions 5 are provided on the edges of this tread surface 10 in a serrate or zig-zag fashion along the circumferential direction of the tire.

These recessed and projecting portions 5 comprise V-shaped recessed portions 5a and projecting portions 5b that are continuously provided in an alternate fashion in the circumferential direction of the tire. The leading end of projecting portions 5a formed between the recessed portions 5a is made thin and pointed. As shown in FIG. 1, the recessed portions 5a gradually go deeper, and are deepest at an end portion open toward the outer side surface 7 of the shoulder portion. In addition, these recessed portions 5a each have a groove bottom 11 that is formed into a round curved surface.

Thus, providing the recessed and projecting portions 5, the latter portions 5b being made pointed at the leading end thereof, on the edges of the tread surface 10 in a zig-zag fashion makes it possible to reduce the rigidity of the edges of the tread surface 10 without substantially reducing the ground contacting area of the tread surface 10. In other words, in a case where the above recessed and projecting portions 5 are provided on the edges of the tread surface 10, respectively, when these recessed and projecting portions 5 are brought into contact with the inner walls of ruts, the pointed projecting portions 5b are first brought into point contact with the inner walls of the ruts. Although the reaction is small in the beginning, the projecting portions are brought into contact with the inner walls of the ruts such that the reaction gradually increases as the projecting portions tread heavier or deeper in the ruts. Due to this, even if the recessed and projecting portions 5 are incompressible, there is no chance of tires being pushed back from the inner walls of the ruts, the tires being allowed to ride over the ruts in an easy fashion. In addition, providing the recessed and projecting portions 5 in a zig-zag fashion on the edges of the tread surface 10 serves to improve the biting properties into the inner walls of ruts, helping the tires to get out of the ruts.

In order to further improve the above-described function and effectiveness of the present invention, a pitch l between, the recessed portions 5a of the recessed and projecting portions 5 and the width of the recessed portion 5a measured in the direction of the axis of rotation of the tire a, respectively, are preferably related in such a manner that a ratio of a to l falls within a range shown by the following expression:

$$0.1 < a/l < 0.2 \qquad (1)$$

If the above ratio (a/l) falls within the range defined by the above expression (1), it is possible to reduce the rigidity of the edges of the tread surface without substantially reducing the ground contacting area of the tire, thereby making it difficult to generate a rut-related wandering phenomenon, while maintaining high speed performance, abrasion resistance, and low fuel consumption that are inherent in a radial tire.

Figure 4:
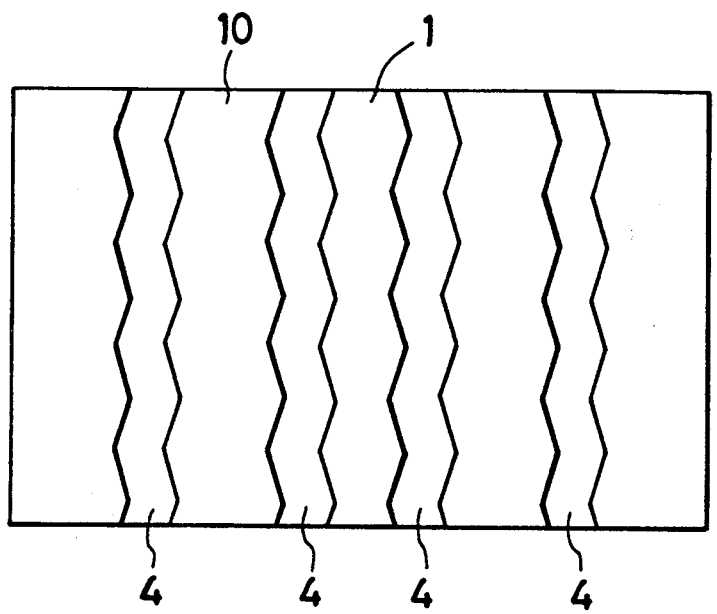
FIG. 4 is a plan view of a tread portion of a conventional pneumatic tire for heavy-duty vehicles.

Tires of the present invention constructed as shown in FIGS. 1 and 2 and conventional tires having a tread surface as shown in FIG. 4 (the interior structure is the same as that of the tires of the present invention) were, respectively, fitted on automobiles whose empty vehicle weight (the axle weight of the steering wheels) is 3910 kg. Ten test drivers ran the respective vehicles without any loads on a test course having ruts formed therein at speeds ranging from 80 to 90 km/h in such a manner as to run straight inside the ruts or to go into and/or out of the ruts so that the tires are intentionally brought into abutment with the inner walls of the ruts. The feeling that the ten drivers had were rated by each driver in a ten-point method with the conventional tire being a standard, and an average value by the ten drivers was used as the wandering preventing performance of each tire.

When rating the feeling that the drives had, the following factors were rated; frequency of the occurrence of wandering, wandering distance, speed of wandering movements, damping of wandering, response to the steering wheel, behaviors of the vehicles when they go into and out of the ruts, and so forth. The results of the test are shown in the following table.

The size of the tires used was 1000 R 20 only.

|  | FEELING RATING |
|---|---|
| TIRE OF THE PRESENT INVENTION | 6.5 |
| CONVENTIONAL TIRE | 5.0 |

It is obvious from the above table that the tire of the present invention is superior to the conventional tire in wandering preventing performance.

What is claimed is:

1. A pneumatic radial tire for heavy-duty vehicles having reinforcement belts consisting of metal cords disposed in a tread portion, and a plurality of main grooves extending in the circumferential direction of the tire and formed in a tread surface, wherein recessed projecting portions are provided in the edges of said tread surface in a zig-zag fashion along the circumferential direction of said tire, said recessed and projecting portions comprising V-shaped recessed portions continuously arranged on the edge portions of said tread surface around the entire circumferential direction of said tire, and a bottom portion of each of said recessed portions gradually increases in depth to an end portion and said bottom portion at the outer surface of the shoulder portion is a round curved surface.

2. A pneumatic radial tire for heavy-duty vehicles according to claim 1, wherein said projecting portions formed between said recessed portions each have a pointed shape toward a leading end thereof.

3. A pneumatic radial tire for heavy-duty vehicles according to claim 1, wherein said recessed portions gradually become deeper from said tread surface toward an outer side surface of a shoulder portion of the tire and are deepest at an end portion open toward said outer side surface of said shoulder portion.

4. A pneumatic radial tire for heavy-duty vehicles according to claim 1, wherein a ratio of a width a of said recessed portion in the tire rotating axis direction to a pitch l between said recessed portions of said recessed and projecting portions satisfies the following relationship:

$$0.1 < a/l < 0.2$$

* * * * *